US011424993B1

(12) United States Patent
Chaoji et al.

(10) Patent No.: US 11,424,993 B1
(45) Date of Patent: Aug. 23, 2022

(54) ARTIFICIAL INTELLIGENCE SYSTEM FOR NETWORK TRAFFIC FLOW BASED DETECTION OF SERVICE USAGE POLICY VIOLATIONS

(71) Applicant: Amazon Technologies, Inc., Seattle, WA (US)

(72) Inventors: Vineet Shashikant Chaoji, Bangalore (IN); Pranav Garg, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 243 days.

(21) Appl. No.: 15/608,748

(22) Filed: May 30, 2017

(51) Int. Cl.
*G06F 15/173* (2006.01)
*H04L 41/16* (2022.01)
*H04L 9/40* (2022.01)
*H04L 41/0816* (2022.01)
*G06N 20/00* (2019.01)

(52) U.S. Cl.
CPC ............ *H04L 41/16* (2013.01); *G06N 20/00* (2019.01); *H04L 41/0816* (2013.01); *H04L 63/1425* (2013.01); *H04L 63/20* (2013.01)

(58) Field of Classification Search
CPC ..... H04L 41/16; H04L 63/20; H04L 63/1425; H04L 41/0816; G06N 20/00
See application file for complete search history.

(56) References Cited

U.S. PATENT DOCUMENTS

| 6,772,345 | B1 | 8/2004 | Shetty |
| 7,058,974 | B1 | 6/2006 | Maher, III et al. |
| 7,096,368 | B2 | 8/2006 | Kouznetsov et al. |
| 7,779,472 | B1 | 8/2010 | Lou |
| 8,069,484 | B2 | 11/2011 | McMillan et al. |
| 8,161,548 | B1 | 4/2012 | Wan |
| 8,312,545 | B2 | 11/2012 | Tuvell et al. |
| 2002/0133721 | A1* | 9/2002 | Adjaoute ............ H04L 63/0407 726/23 |
| 2003/0070003 | A1* | 4/2003 | Chong ................ H04L 63/1408 719/330 |
| 2007/0239999 | A1* | 10/2007 | Honig .................... G06N 7/005 713/194 |

(Continued)

OTHER PUBLICATIONS

U.S. Appl. No. 13/942,630, filed Jul. 15, 2013, Andries Dippenaar.

(Continued)

*Primary Examiner* — Suraj M Joshi
*Assistant Examiner* — Jaren Means
(74) *Attorney, Agent, or Firm* — Robert C. Kowert; Kowert, Hood, Munyon, Rankin & Goetzel, P.C.

(57) ABSTRACT

At an artificial intelligence based service to detect violations of resource usage policies, an indication of a first data set comprising a plurality of network traffic flow records associated with at least a first device of a set of devices may be obtained. Using the first data set, a machine learning model may be trained to predict whether resource usage of a particular device of a particular network violates a first resource usage acceptability criterion. In response to determining, using a trained version of the model, that the probability that a second device has violated the acceptability criterion exceeds a threshold, one or more actions responsive to the violation may be initiated.

20 Claims, 9 Drawing Sheets

(56) References Cited

U.S. PATENT DOCUMENTS

| | | | | |
|---|---|---|---|---|
| 2011/0047618 | A1* | 2/2011 | Evans | G06F 21/566 |
| | | | | 726/23 |
| 2017/0279831 | A1* | 9/2017 | Di Pietro | H04L 43/0894 |
| 2017/0279837 | A1* | 9/2017 | Dasgupta | H04L 41/142 |
| 2018/0124105 | A1* | 5/2018 | Rodrigues | H04L 63/10 |
| 2018/0218167 | A1* | 8/2018 | Narayanaswamy | H04L 63/123 |

OTHER PUBLICATIONS

U.S. Appl. No. 15/252,038, filed Aug. 30, 2016, Bjoern Doebel et al.
U.S. Appl. No. 14/659,019, filed Mar. 16, 2015, Stephen George Fridakis.
Tianqi Chen, "Introduction To Boosted Trees", University of Washington, Oct. 22, 2014, pp. 1-41.
"Introduction to Boosted Trees", Retrieved from URL: http://xgboost.readthedocs.io/en/latest/model.html on Mar. 27, 2017, pp. 1-10.

* cited by examiner

| Policy violation category 602 | Minimum input traffic flow collection interval 604 (may be identified using meta-parameter optimization algorithm/model) |
|---|---|
| Category A | T1 minutes |
| Category B | T2 hours |
| Category C | T3 seconds |

Meta-parameter optimization model 610

*FIG. 6*

ARTIFICIAL INTELLIGENCE SYSTEM FOR NETWORK TRAFFIC FLOW BASED DETECTION OF SERVICE USAGE POLICY VIOLATIONS

BACKGROUND

Many companies and other organizations operate computer networks that interconnect numerous computing systems to support their operations and the services they provide to their end customers distributed worldwide. For example, data centers housing significant numbers of interconnected computing systems have become commonplace, such as private data centers that are operated by and on behalf of a single organization, and public data centers that are operated by entities as businesses to provide computing resources to customers. In many cases providers set up large networks that may logically span several regions or even countries, and may include numerous data centers with varying levels of services and facilities available, utilized together to provide a unified set of services to their end customers.

In some data centers that have been set up to provide computing and/or storage facilities to remote clients or customers, the set of computational resources at the data center may be dynamically divided into resource pools, with each pool being made available for exclusive use by a given client or customer for designated periods of time. The resources allocated to a given client may, for example, comprise numerous virtual or physical machines, which are configured for network communication with other resources within the provider network and also with network endpoints outside the provider network (e.g., in the public Internet). A wide variety of applications may be run using virtual machines instantiated at hosts of a computing service at low costs. A provider network operator may in many cases have limited or no visibility with regard to the specific applications that are being run using a given set of the provider network's resources.

Unfortunately, it may sometimes be the case that some subset of the provider network's resources may be misused for inappropriate or malicious applications, such as applications that may attempt various types of network-based attacks on other customers or on entities outside the provider network. Such misuse of resources, while typically extremely rare, may nevertheless represent a business threat to the provider network operators. For operators of large provider networks, which may comprise hundreds or thousands of virtual or physical machines assigned to thousands of customers, trying to detect and respond to such infrequent misuse of network resources without impacting the vast majority of customers who are not involved in the misuse may present a non-trivial technical challenge.

BRIEF DESCRIPTION OF DRAWINGS

FIG. 6 illustrates examples of variations in the traffic flow data collection intervals for detecting different categories of usage policy violations, according to at least some embodiments.

Figure 1:
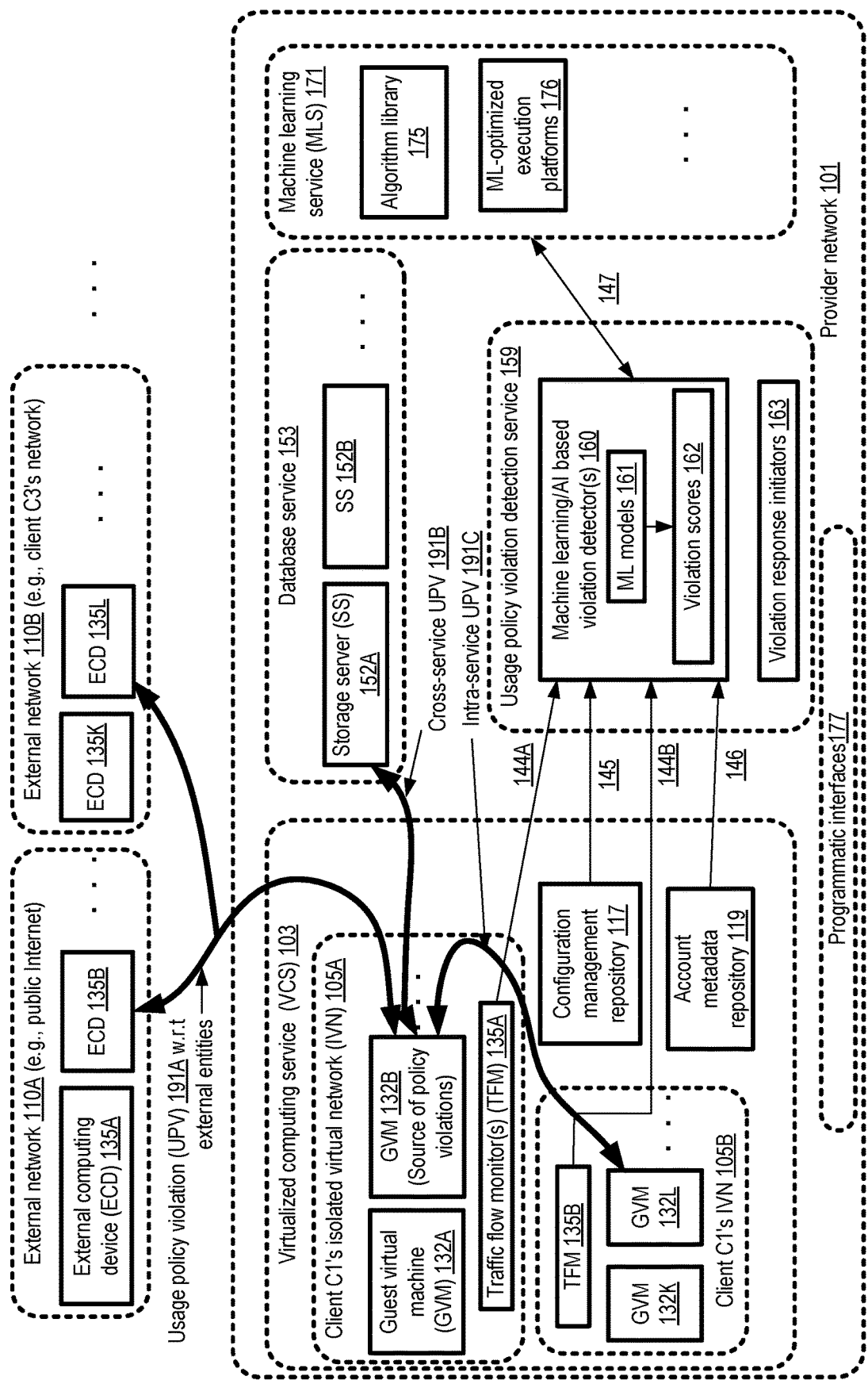
FIG. 1 illustrates an example system environment in which machine learning models may be utilized to detect potential violations of resource usage policies at a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for detecting violations of resource usage policy violations in large network environments in a non-intrusive and low-overhead manner using machine learning models are described. For example, in some embodiments network usage policies of various types of large-scale infrastructure environments may require that the network resources of such environments are not to be used for malicious or harmful operations such as spreading viruses or other malware, performing denial-of-service attacks and the like, and the machine learning models may be trained to detect such behavior quickly, without impacting the traffic of infrastructure users who do not violate the policies. In at least some embodiments, the resource usage policies may define various usage acceptance criteria, and the goal of the machine learning models may include detecting scenarios in which one of more usage acceptance criterion are violated. At a high level, the workflow associated with detecting resource usage policy violations may comprise at least the following types of operations in various embodiments: operations to identify or select classes or categories of usage violations, operations to collect data sets that include examples of such violations as well as examples of resource usage which does not represent violations, the training of machine learning models using the collected data sets, and the deployment and execution of the trained machine learning models using input data sets collected from candidate devices which may or may not have violated the usage policies. In at least some embodiments, these operations may be performed on an ongoing basis—e.g., new categories or patterns of usage violations or misuse may potentially be identified over time, models may be retrained or new models may be generated, and violation detection efforts may be performed continually or periodically.

In at least one embodiment, the machine learning models may be trained and executed in a provider network environment. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries). In some embodiments, the machine learning models may be used to detect potential violations of usage acceptance criteria by devices of the provider network itself—for example, the models may examine traffic flow information and other input records to determine whether the traffic of particular virtual or physical machines of one or more provider network services is violating (or has violated) applicable usage acceptance criteria.

In at least one embodiment, the ability to detect usage acceptability criteria violations using machine learning models may be offered as part of the functionality of a network-accessible service of the provider network, which can be employed to detect violations committed outside or within the provider network, e.g., at a customer-owned network or at a subset of a customer's resources within the provider network. In some embodiments one or more types of usage policy violations may involve the use of multiple devices concurrently (e.g., if multiple machines are set up as a botnet), and the set of devices which are to be analyzed for usage policy violations may comprise some devices inside the provider network and some devices outside the provider network. In at least one embodiment, a standalone tool implemented at one or more computing devices, which trains machine learning models to detect usage policy violations and/or executes trained versions of such models without using provider network resources may be used—that is, the use of a provider network is not a requirement for the techniques described herein. Although the misuse of networking resources is used as a primary example of the kinds of resource usage policy violations that may be detected in much of the remainder of this document, in at least some embodiments similar techniques and algorithms to those described herein may be used with equal success to detect usage policy violations with respect to other resources such as processors, storage devices and the like.

According to some embodiments, a determination may be made that network traffic of a first set of one or more devices of a first service of a provider network violated at least a first network usage acceptability criterion during at least a first time interval. Such a determination may be made, for example, as a result of complaints of misuse of network resources received via a publicly-provided programmatic interface of the provider network, as a result of evidence collected by third parties or monitoring tools, and/or as a result of fine-grained analysis of resource usage (which may include examining storage devices to identify the kinds of programs which may have been run from the devices of the first set) in various embodiments. A training data set may be obtained for a machine learning model to be used to detect instances of similar violations, e.g., by other devices or the same devices. In at least some embodiments, the training data set may comprise, for example, a plurality of traffic flow records associated with at least some devices of the first set, account metadata associated with a client account to which one or more devices of the first set were allocated, and/or configuration settings of at least some devices of the first set. The training data set may include some number of raw input data elements and one or more features derived from the raw input in various embodiments.

In one embodiment, with respect to traffic flow, the training data set may include, for example, indications of source and destination network addresses for various network transmissions, source and destination network ports, packet sizes, the networking protocol used to transmit or receive a packet at various levels of the network stack, the ratio of incoming to outgoing traffic during a time period, the temporal distribution of network packet sizes, and/or the total number of network flows during a time period. At least some of these data elements may already be collected at a provider network in various embodiments, e.g., for billing clients based on their resource usage levels, and as such collecting such information may impose little or no additional overhead in such embodiments. In some embodiments in which the devices whose behavior is being analyzed include virtual machines set up on behalf of provider network clients, raw traffic flow data such as addresses, ports and packet sizes may be collected at virtualization management components of the provider network. Other features (such as the ratios of incoming to outgoing packets or the temporal distribution of packet sizes) may be derived from the raw data collected in various embodiments, e.g., at a computing device outside the main pathway used for customer traffic, and hence may also not result in overhead from the perspective of the clients of the provider network.

In some embodiments, with respect to account metadata of a particular client to whom a device has been assigned or allocated, the training data set may include, for example, a time period for which the client account has existed or been in good standing, a fraud score associated with the client account, billing or payment records associated with the client account and/or a customer tier associated with the client account. In some embodiments, individual customer or client accounts may be classified into one of a small set of tiers (such as bronze, silver or gold tiers), e.g., based on the duration for which the customer has used resources of the provider network, the volume of resources used, etc. and the tier may be a useful signal in predicting the probability of some types of resource misuse.

In one embodiment, configuration information collected for inclusion in the training data set may include, among other elements, respective indications of service resource classes to which various devices represented in the training data set belong, operating systems and/or software stacks used at various devices, processor configurations, memory configurations, networking settings, and so on. In various embodiments, the account metadata and/or the configuration information may be obtained, e.g., from administrative components of the provider network, without imposing any overhead on the flow of customer application data.

In various embodiments, using the training data set, one or more machine learning models to predict whether network traffic of a particular device of the provider network (e.g., a device within the same service at which the violation used for training data was identified) violates a network usage acceptability criterion may be developed or trained. A trained version of such a machine learning model may then be deployed to detect potential future violations in such embodiments, e.g., by providing the trained version input data corresponding to network activity performed at a candidate set of devices during some selected time interval. The machine learning model may generate, corresponding to various devices whose traffic is analyzed, respective probabilities that the network usage acceptance criterion has been violated or is being violated in some embodiments. Such probabilities may also be referred to as violation "scores" in some embodiments. If the score generated for a particular device exceeds a threshold, indicating that the particular device is likely to have violated the acceptance criterion, one or more acceptable usage violation response actions may be initiated in at least some embodiments. Such response actions may include, for example, performing a more detailed analysis of the behavior of the suspect device to verify that the usage policy was indeed violated, providing programmatic warnings to the entity on whose behalf the suspect device was being used, and/or terminating network connectivity between the suspect device and one or more other devices.

A variety of machine learning models may be used in different embodiments, including linear models such as logistic regression, tree-based models of various kinds (such as Classification and Regression Tree or CART models), ensemble models such as random forest models, xgboost and other boosted gradient models, and/or neural network models. In some embodiments, a plurality of classification models (e.g., for binary classification, or for multi-class classification) may be trained using some combinations of such modeling techniques. In various embodiments, implementations of each of the models may, for example, include memory for storing input values and parameters and computer-executable instructions for an initial set of computations on the input values. In some embodiments, intermediary layers of the model may include memory storing computer-executable instructions and/or data for manipulating the results of the initial computations and determining values to be transmitted to an output layer. The output layer may in turn include memory and/or computer-executable instructions for generating and/or storing output values such as the scores indicating policy violation probabilities. Any of a number of types of data structures may be used for storing data and/or implementing the algorithm logic, e.g., including various tree-based structures as well as data structures optimized for storing matrices, vectors, arrays, hash tables and the like.

In at least one embodiment, a number of types or classes of usage policy violating behavior patterns may be identified, and respective models may be trained for detecting instances of some or all of the classes. The types of policy violating behavior patterns for which respective models may be trained in one embodiment may include, among others, a denial of service pattern, a Trojan horse behavior pattern, a pattern of non-payment or under-payment for service usage, a pattern of unauthorized advertising, a spam distribution pattern, a spyware distribution pattern, a virus or worm distribution pattern, or a rootkit distribution pattern. In some embodiments, a single model may be trained to identify or predict instances of multiple categories of usage policy violations.

According to some embodiments, a network-accessible service at which usage policy violations are detected using machine learning models may implement a set of programmatic interfaces which can be used by clients to submit requests to detect violations. The programmatic interfaces may include, for example, a web-based console, a set of application programming interfaces (APIs), command line tools, and/or graphical user interfaces in different embodiments. In one such embodiment, a client of such a service may indicate, via respective parameters of such a programmatic request, the usage policies or acceptability criteria whose violations are to be detected, labeled training data sets to be used for the models, sources from which input data is to be obtained to detect violations using the trained models, and so on. In response to such a request, the appropriate set of machine learning models may be trained at the service and then deployed to analyze input from the production environments at which potential policy violations are to be identified.

In one embodiment in which respective machine learning models are trained for different categories of resource misuse, the amount of traffic flow data that has to be provided to (and analyzed at) a model to generate useful predictions may differ based on the misuse category. For example, the duration for which network traffic flow records have to be collected for successfully detecting denial-of-service attacks may differ from the duration for which network flow records have to be collected for successfully detecting virus distributions. The minimum amount of time for which traffic flow data is to be collected for models corresponding to various policy violation categories may itself represent a meta-parameter that can be learned in some embodiments—e.g., a higher-level machine learning model may be used in one embodiment to identify the minimum or optimal time intervals of traffic flow collection for various policy violation prediction models.

Example System Environment

FIG. 1 illustrates an example system environment in which machine learning models may be utilized to detect potential violations of resource usage policies at a provider network, according to at least some embodiments. As shown, system 100 may comprise a provider network 101 at which a plurality of network-accessible services may be implemented, including for example a virtualized computing service (VCS) 103, a database service 153, a machine learning service (MLS) 171, and a usage policy violation detection service 159 in the depicted embodiment. At the request of clients of the VCS 103, a plurality of isolated virtual networks (IVNs) 105 may be established, including for example IVN 105A set up for a client C1 and IVN 105B set up for a different client C2. An isolated virtual network may comprise a collection of networked resources (including, for example, guest virtual machines 132) allocated to a given client, which are logically isolated from resources allocated for other clients in other isolated virtual networks. The client on whose behalf an IVN is established may be granted substantial flexibility regarding network configuration for the resources of the IVN—e.g., private IP addresses for application compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. In the depicted embodiment, GVMs 132A and 132B may have been established in IVN 105A on behalf of client C1, and GVMs 132K and 132L may have been established in IVN 105B on behalf of client C2.

VCS clients may run various types of applications at their GVMs in the depicted embodiment, and a given application may communicate with other entities inside and outside the provider network. For example, GVMs 132A or 132B may communicate with other GVMs within the same isolated virtual network 105A, with GVMs or other resources in other IVNs such as IVN 105B, with resources of other services (such as storage servers 152A or 152B of the database service 153) and/or with external computing devices (ECDs) 135 outside the provider network. In the depicted embodiment, for example, GVMs within IVN 105A may participate in network traffic flows with ECDs 135A or 135B in a first external network 110A such as the public Internet and/or with ECDs 135K and 135L in a second external network 110B which may belong to a client C3 of the provider network. The VCS 102 may comprise a number of administrative components in various embodiments, such as a configuration management repository 117, an account metadata repository 119 and the like.

The VCS 103 (as well as other services of the provider network which include resources allocated to clients) may have an associated resource usage policy which may define a number of usage acceptability criteria in the depicted embodiment—e.g., with some set of rules indicating the types of resource usage (such as network usage, processor usage and the like) behavior which are considered unacceptable by the provider network operator. For example, network usage that results in the equivalent of a denial of service attack, or the spread of viruses or worms, as well as other patterns of network misuse discussed below in further detail, may be considered unacceptable according to criteria defined in a network usage policy in one embodiment. In some embodiments, a service level agreement which defines the acceptable resource usage policies and/or criteria may be set up between clients and the provider network operator.

It may sometimes be the case that some resources allocated to service clients violate one or more applicable resource usage policies during one or more time periods. With respect to network usage, for example, traffic patterns exhibited by a given resource such as a GVM 132 may represent unacceptable behavior with respect to at least three peer device types in the depicted embodiment. For example, GVM 132B may exhibit behavior representing a first usage policy violation (UPV) 191A in its interactions with external computing devices such as ECD 135B, a second UPV 191B in its interactions with resources of other (non-VCS) services such as storage server 152A of database service 153, and a third UPV 191C in its interactions with other resources within the VCS itself (e.g., GVM 132L). In some embodiments, usage policy violations which target or affect other services of the provider network may be referred to as cross-service UPVs in the depicted embodiment, violations which target resources within the same service as the source of the violation may be referred to as intra-service UPVs, and violations which target resources outside the provide network may be referred to as external entity UPVs. In one embodiment, respective sets of machine learning models may be generated for detecting and analyzing each of these UPV categories.

In some embodiments, the provider network 101 may implement a set of one or more programmatic interfaces 177, some of which may form example be used by various parties inside or outside the provider network to report (and in some cases provide evidence of) misuse or violations of acceptable use policies, and/or to obtain reports indicating such violations. In at least one embodiment, the provider network may comprise administrative components which verify reports of misuse of resources, e.g., based on evidence collected by clients, third parties or monitoring tools, and/or as a result of fine-grained analysis of resource usage.

For a number of reasons, such as for billing and for resource management and planning, records of traffic flows associated with various resources such as GVMs 132 may be retained for some time periods (e.g., a week or a month) by administrative components of the VCS and other services in some embodiments. With respect to GVMs 132, such records may be collected, for example by traffic flow monitors (TFMs) 135A or 135B in the depicted embodiment. TFMs 135 may be implemented at various layers or levels of the software/hardware stacks used in respective services in different embodiments—for example, in one embodiment a TFM may be implemented in a virtualization management component which acts as an intermediary between a GVM and the hardware on the host at which the GVM runs.

The operator of the provider network may attempt to identify violations of acceptable usage of resources at various services and take responsive actions in at least some embodiments, e.g., with the help of a usage policy violation detection service 159. In the depicted embodiment, usage policy violation detection service 159 may comprise one or more machine learning or artificial intelligence based violation detectors 160, individual ones of which may be implemented using one or more computing devices.

In various embodiments, a number of categories of resource usage policy violations may be identified, e.g., at the usage policy violation detection service 159 based on the reports and evidence received via the PIMR 177 and/or based on internal analysis by administrative components of the provider network. A training data set comprising examples of traffic associated with such violations may be accumulated for a machine learning model 161, e.g., using traffic flow records generated at TFMs 135 and other data sources. In the depicted embodiment, for example, traffic flow data pertaining to incoming and/or outgoing packets at GVMs 132 may be collected from TFMs 135 at a violation detector 160, as indicated by arrows 144A and 144B. In addition, the training data set may comprise configuration settings for various GVMs 132, obtained from configuration management repository 117 as indicated by arrow 145. Furthermore, the training data set in some embodiments may comprise account metadata pertaining to the client accounts on whose behalf the GVMs 132 are instantiated, obtained for example from account metadata repository 119, as indicated by arrow 146. In some embodiments, raw data obtained at the violation detector 160 may be processed to generate some number of derived features for the machine learning models 161.

Using the training data set, which may comprise a subset of labeled records representing violations of acceptable usage policies as well as another subset of labeled records representing acceptable behavior, one or more machine learning models 161 may be trained to detect potential patterns of usage policy violations in unlabeled data sets in the depicted embodiment. In various embodiments, implementations of each of the models 161 may, for example, include memory for storing input values and parameters and computer-executable instructions for an initial set of computations on the input values. In some embodiments, intermediary layers of the model may include memory storing computer-executable instructions and/or data for manipulating the results of the initial computations and determining values to be transmitted to an output layer. The output layer may in turn include memory and/or computer-executable instructions for generating and/or storing output values such as the scores indicating policy violation probabilities. Any of a number of types of data structures may be used for storing data and/or implementing the algorithm logic, e.g., including various tree-based structures as well as data structures optimized for storing matrices, vectors, arrays, hash tables and the like.

In some embodiments, a respective violation score 162 may be assigned to individual ones of the devices (e.g., GVMs) being analyzed, indicating the predicted probability that the device has violated and/or is violating one or more usage acceptability criteria in the depicted embodiment. After a model 161 has been trained, new unlabeled input data collected from various resources or devices such as GVMs 132 may be provided to the trained version in various embodiments, and the respective scores corresponding to the devices may be generated. If the score 162 for a given device exceeds a threshold, indicating that the probability that the device has violated acceptable use rules is high, one or more actions with respect to the device may be initiated in some embodiments, e.g., by violation response initiators 163 of the service 159. Such actions may include, for example, providing a warning to the client on whose behalf the resource which may have violated the policy was being used, initiating finer-grained analysis of the behavior of the suspect device, terminating connectivity of the device from one or more portions of the network, and so on. In some embodiments, respective machine learning models 161 may be trained for each of several categories of resource usage violations, and as a result a list of scores may be generated for each device being considered, with one element of the list corresponding to each usage violation category.

In at least some embodiments, a violation detector 160 may utilize resources of one or more other services of the provider network 101. For example, as indicated by arrow 147, the violation detector 160 may utilize resources of the machine learning service to train and/or execute at least some machine learning models 161. The algorithm library 175 of the MLS 171 may comprise executable code for a variety of models, including for example linear models such as logistic regression, various types of decision tree models, ensemble models such as random forest or xgboost, as well as neural network models. Some or all of these types of models may be utilized for detecting instances or examples of one or more categories of usage policy violations in the depicted embodiment by service 159. In addition, in at least some embodiments, the MLS 171 may comprise or have access to a variety of execution platforms 176 which are optimized for machine learning, such as GPU-based platforms and the like. In one embodiment, such optimized platforms may be employed by the usage policy violation detection service 159, e.g., for training models 161 and/or for executing trained versions of the models 161. In at least one embodiment, the usage policy violation detection service 159 may utilize one or more other services, such as the database service whose storage servers 152 may be used to store intermediate or final results of the machine learning models, or to store the input data sets for training and post-training runs of the models. In some embodiments, virtual machines of the VCS may be employed for some of the operations performed by violation detectors 160.

In the discussion above with respect to the embodiment depicted in FIG. 1, machine learning models 161 have been described as being used to detect possible violations of acceptable network usage by GVMs 132. In at least some embodiments, similar techniques may be used to detect potential violations of respective usage policies by devices at external networks (such as external computing devices 135 at client C1's network 110B), and/or by resources of other services (such as storage servers 152 of database service 153 or execution platforms of MLS 171). Thus, resources of the provider network may be used to detect usage policy violations outside the provider network in at least one embodiment. In some embodiments, as mentioned earlier, machine learning or artificial intelligence based usage policy violation detectors 160 may be implemented without using resources of a provider network—e.g., such a detector may be implemented as a standalone tool using one or more computing devices, and may be employed within any types of networking or computing environment.

Model Training and Deployment Overview

Figure 2:
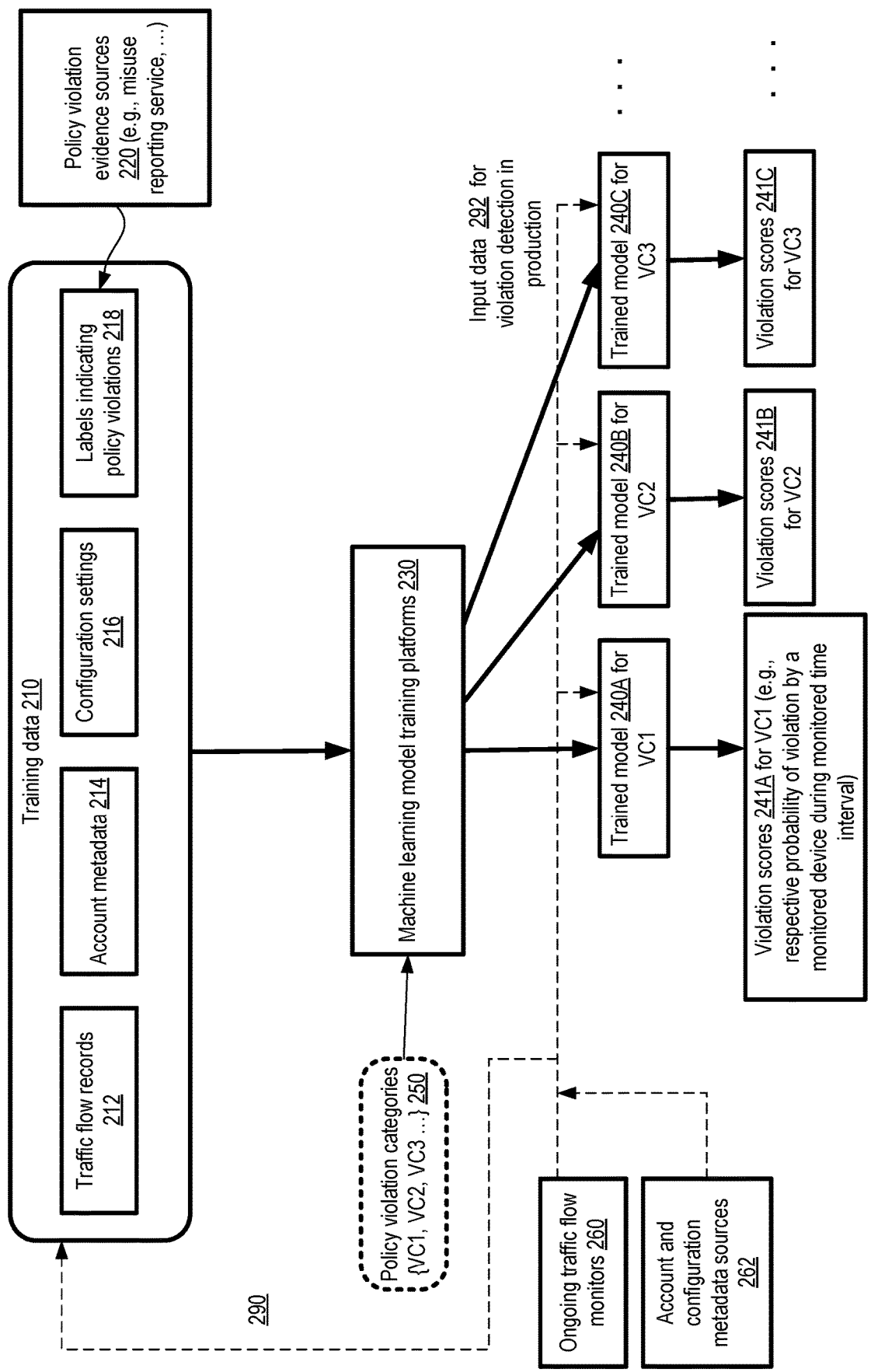
FIG. 2 illustrates an overview of training and deployment of respective machine learning models for detecting various categories of usage policy violations, according to at least some embodiments.

FIG. 2 illustrates an overview of training and deployment of respective machine learning models for detecting various categories of usage policy violations, according to at least some embodiments. In the depicted embodiment, a set of training data 210 may be obtained for one or more machine learning models, comprising for example traffic flow records 212 collected over some time period, account metadata 214 associated with various authorization entities on whose behalf the traffic was transmitted, configuration settings 216 pertaining to the hardware and/or software devices or components from which or to which the traffic flows were directed, and a set of labels 218 indicating which of the other data elements of the training data corresponded to occurrences of violation of usage policies. In many cases, the fraction of the training data records which represent instances of usage policy violations may be quite low—e.g., out of millions of traffic flow records 212 collected over some number of hours from a large data center, no more than a few dozen may represent misuse of the resources in some cases.

Any combination of a number of different policy violation evidence sources 220 may be used to identify the subset of records which should be labeled as policy violations in some embodiments. In one embodiment, a provider network at which the policy usage violation analysis is to be performed may provide programmatic interfaces which can be used to report allegations of policy violations—e.g., by the target of a network-based attack, or by some third party. If and when such allegations are received, in some embodiments one or more additional levels of verification or analysis may be performed, e.g., using network sniffers, detailed log analysis, or other tools, to check the veracity of the allegations.

A number of policy violation categories {VC1, VC2, . . . } 250 may be identified over time in the depicted embodiment, e.g., based on the detection of respective instances of different types of unusual or unexpected traffic flow patterns which have been reported and/or verified as violations of the usage policy. Examples of such categories may include virus propagation, denial-of-service attacks and so on.

Using the training set examples, respective machine learning models may be trained at a set of training platforms 230 for detecting instances of each of the different categories 250 in the depicted embodiment. In some cases, different sizes of input training data sets may be needed to train models to detect respective categories—e.g., the set of training data used may vary by violation category 250. Not all the models may use the same algorithms in at least one embodiment—e.g., an xgboost algorithm may be used for one category, a neural network model may be used for another category, and so on.

The trained models 240 (e.g., model 240A for violation category VC1, model 240B for violation category VC2, and model 240C for violation category VC3) may be executed to generate respective violation scores 241 (e.g., 241A, 241B or 241C) for new traffic flows which were not included in the training data set 210 in the depicted embodiment. Input data 292 provided to the trained models 240 for detecting violations in the production environment may comprise flow records collected from ongoing traffic flow monitors 260 as well as configuration and account metadata sources 262 in some embodiments. The newly collected flow records and associated account and configuration information may also be used to update the training data set 210 in various embodiments, as indicated by arrow 292. A given violation score may, for example, represented a predicted probability that a given monitored device has participated in an instance of a violation of the corresponding category. Thus, if traffic flow data associated with a total of 100000 devices were provided as input to a given trained model 240, in some embodiments 100000 scores may be generated, with one score per device for the type of policy violation being considered. If a violation score associated with a given device exceeds a threshold, one or more responsive actions may be initiated with respect to that device in some embodiments.

Example Model Input Features

Figure 3:
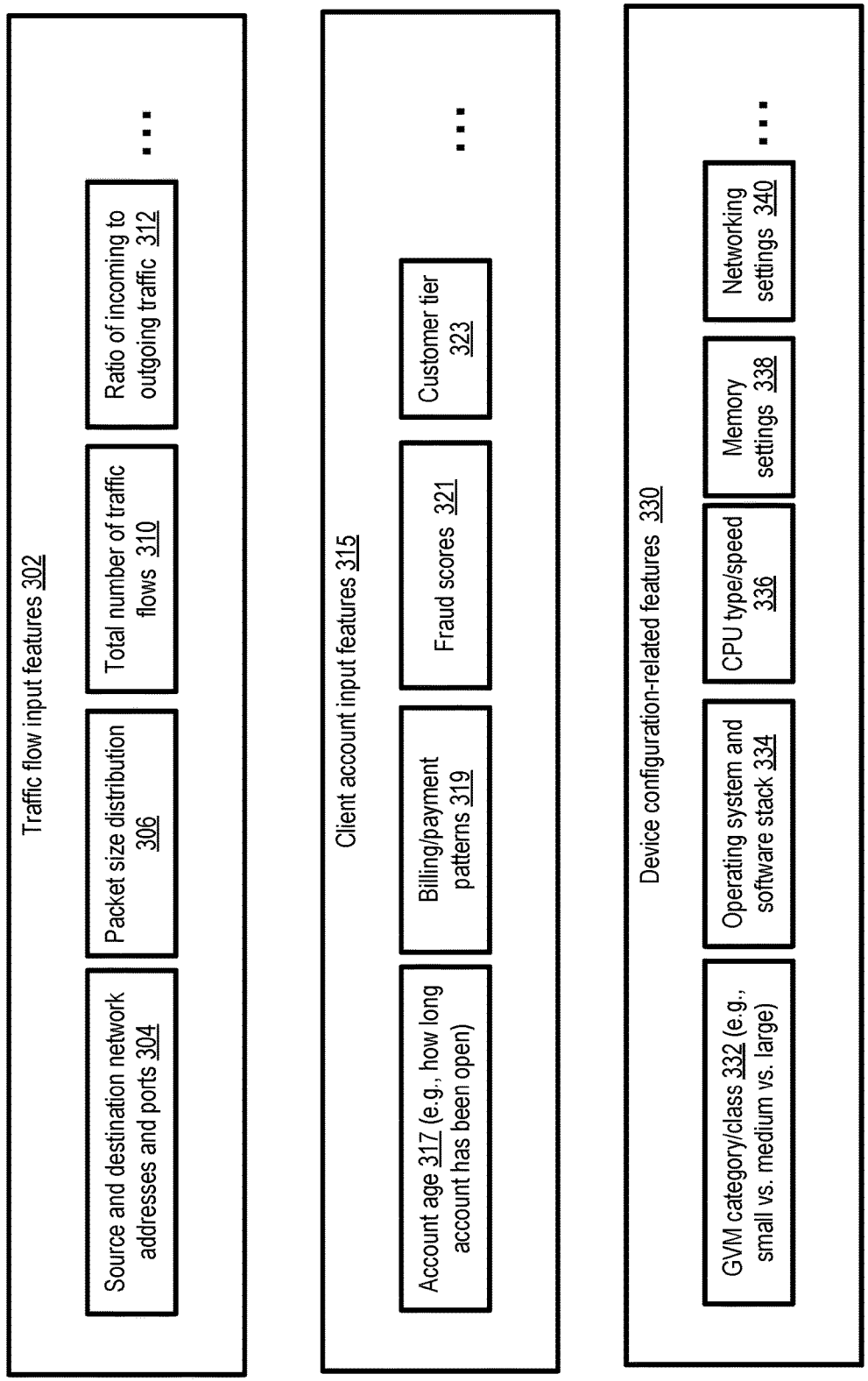
FIG. 3 illustrates examples input features which may be used for the machine learning models for detecting usage policy violations, according to at least some embodiments.

FIG. 3 illustrates examples input features which may be used for the machine learning models for detecting usage policy violations, according to at least some embodiments. As shown, the input features may be classified as traffic flow features 302, account features 315 or device configuration-related features 330 in the depicted embodiment. Some features may correspond to raw input data obtained from data sources such as metrics monitors, configuration tools and the like, while values of other features may be obtained by applying various types of transformation, analysis or aggregation functions to the raw input.

Examples of traffic flow features may include, among others, source and destination network addresses and ports 304 for respective sessions of traffic, the packet sizes or size distributions 306 over time, the total number of traffic flows 310 or sessions, the ratio 312 of incoming to outgoing traffic at a device and so on. In some embodiments, some of the traffic flow features 302 may be indicated at a per-port level—e.g., some TCP/IP (Transmission Control Protocol/Internet protocol) ports may be tied to specific applications, and the traffic patterns, packet sizes etc. associated with such ports may be of interest with respect to identifying unexpected behavior.

Examples of client account input features 315 may include, among others, account ages 317 (e.g., how long the account associated with a given device has remained open), billing or payment patterns 319, fraud scores 321, or customer tiers 323 in the depicted embodiment. Account age may be a signal for some types of resource misuse, e.g., as policies may typically be violated more often by clients with recently-created accounts than by clients who have remained in good standing for a long time in various embodiments. Late billing, or payments made using unusual payment mechanisms, may represent another signal associated with higher probabilities of policy violations in some embodiments. In the depicted embodiment, fraud scores 321 may be generated for at least some customer accounts, e.g., by billing systems, indicative of the probabilities one or more fraudulent transactions were initiated on behalf of a given client. In some embodiments, customers (and associated client accounts) may be designated as belonging to one of several tiers (e.g., platinum, gold, or silver tiers) based on various factors, and the tier to which an account belongs may also be indicative in some cases of the probability that one or more policies are violated by the account.

Examples of device configuration-related features 330 in the depicted embodiment may include, among others, a guest virtual machine (GVM) category or class 332, the operating system and/or software stack 334 being used at a traffic-generating device, the CPU or processor type or speed 336, memory settings 338 (e.g., memory size, memory device type, etc.), networking settings 340 (e.g., various TCP/IP tunable settings such as buffer sizes) and the like. In at least some embodiments in which the devices being analyzed for potential violations of policy include GVMs at a virtual computing service, the service may define various categories of GVMs which can be allocated to clients (such as "small", "medium" or "large" GVMs, with the categories differing from one another based on computing performance capabilities, memory sizes, availability of specialized devices such as graphics processing units (GPUs), and so on, and the category of a given GVM may potentially be related to the probability of usage policy violations originating at the GVM. In at least one embodiment, a sampling technique may be used to select the set of devices whose traffic patterns are monitored during a given time interval—e.g., out of a fleet of a million GVMs, one hundred thousand may be selected using random sampling or attribute-dependent sampling for a given iteration of policy violation analysis. Other features not shown in FIG. 3 may be used for training and executing machine learning models used for policy violation detection in at least some embodiments, while some of the features shown in FIG. 3 may not be used in at least one embodiment.

Example Categories of Usage Policy Violations

Figure 4:
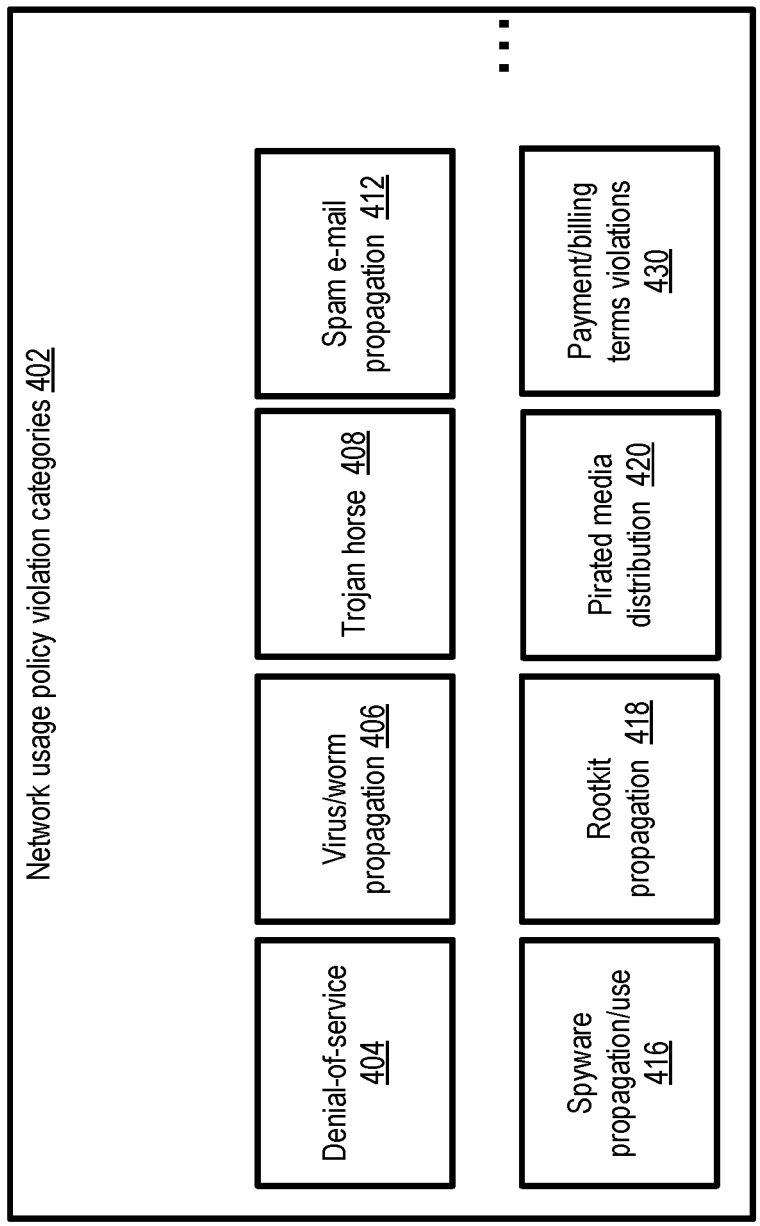
FIG. 4 illustrates examples of categories of network usage policy violations for which respective machine learning models may be trained, according to at least some embodiments.

FIG. 4 illustrates examples of categories of network usage policy violations for which respective machine learning models may be trained, according to at least some embodiments. Some of the usage policy violation categories 402 may be caused by the flow of packets, while in other cases traffic flows may be correlated with rather than caused by the packets. Denial-of-service attacks 404 may represent one example of the former scenario, in which the attacking device may transmit a very large number of packets at a very high rate to an attacked device, thereby preventing the attacked device from responding to service requests which may have been directed to it. Violations of payment or billing terms 430 may represent an example of the second scenario, in which the packets being sent may not by themselves necessarily represent a violation of the policy, but the pattern of usage of the network may be correlated with non-payment or late payment of bills.

Trojan horse behavior 408, in which unauthorized access to accounts or resources is attempted, may represent another category of usage policy violations for which a machine learning-based prediction model may be generated and used in various embodiments. Usage policy violations 402 may also comprise, for example, propagation of unwanted or dangerous software/firmware in the depicted embodiment, such as virus/worm propagation 406, spyware propagation 416, spam email propagation 412, or rootkit propagation 418. A rootkit may, for example, comprise a set of software tools that enable an unauthorized user to gain control of a device such as a computer system or phone without being detected. In some embodiments, the distribution of pirated media 420 (e.g., distribution of television programs, films, books and the like without authorization or permission) may represent another example category of the misuse of network resources.

Over time, new categories of network usage policy violations may be identified in various embodiments, and respective models may be trained and executed for such categories. In one embodiment, a single machine learning model may be able to identify or predict multiple categories of usage policy violations—e.g., the relationship between the policy violation categories and the number of distinct machine learning models used may not necessarily be a 1:1 relationship. In some embodiments, multiple machine learning models may be trained and used to detect or predict instances of a particular category of usage policy violations.

Example Machine Learning Model Types

Figure 5:
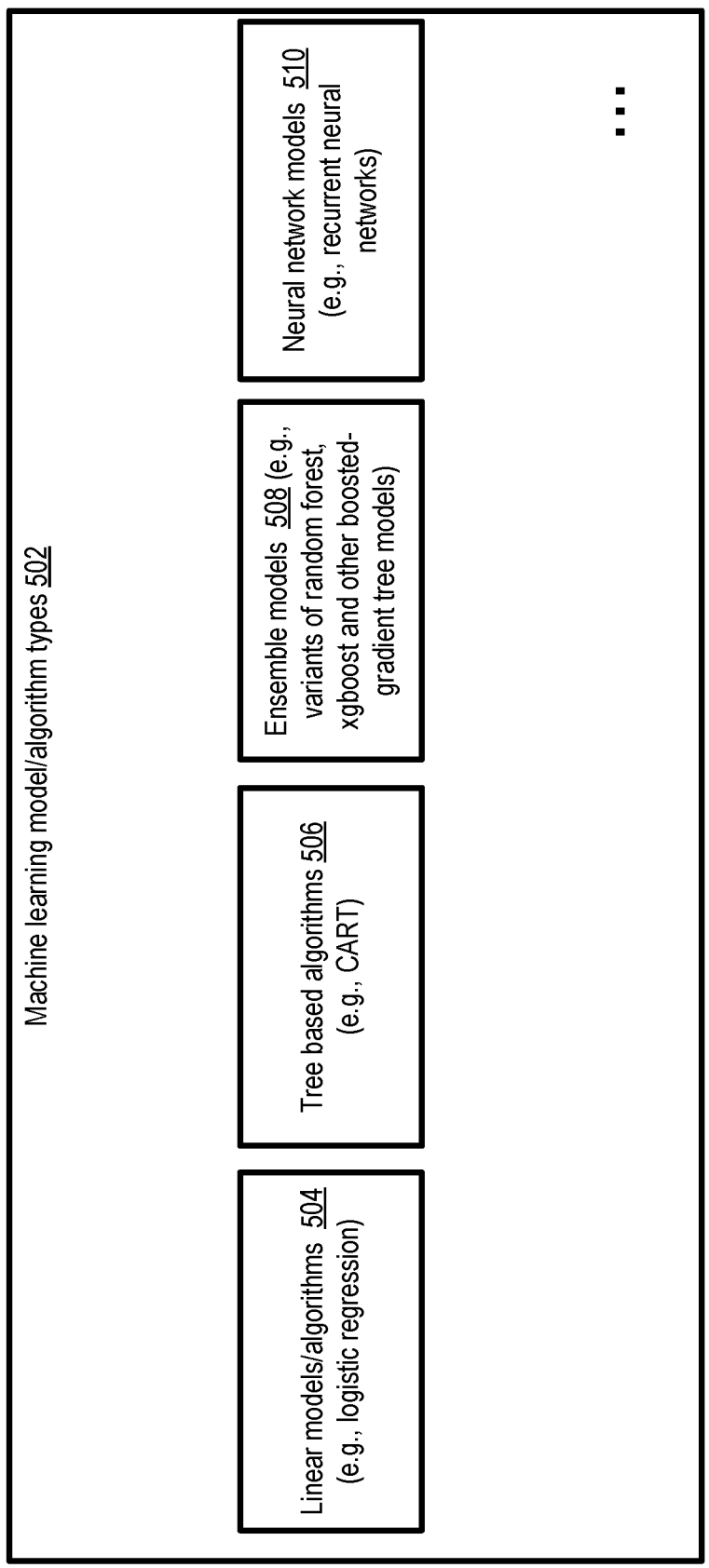
FIG. 5 illustrates examples of types of machine learning models which may be employed for detecting potential usage policy violations, according to at least some embodiments.

FIG. 5 illustrates examples of types of machine learning models which may be employed for detecting potential usage policy violations, according to at least some embodiments. As shown, model or algorithm types 502 may include, among others, linear models 504 (such as logistic regression models), tree-based algorithms 506 (such as algorithms using CART models), ensemble models 508 (such as random forest models or boosted gradient models including xgboost) in which multiple instances of a given type of model are run or a combination of different types of models are run, and/or neural network models 510 (such as recurrent neural networks which take the temporal relationship between input examples into account) in the depicted embodiment. In some embodiments, other types of binary classification or multi-way classification models may be used.

In at least one embodiment, as mentioned earlier, different types of models may be used to detect or predict instances of respective categories of usage policy violations. In some embodiments, multiple model types may be used to detect or predict instances of a particular category of usage policy violations. The particular type or types of models or algorithms used for a particular category of policy usage violation may be selected based on a variety of factors in different embodiments. For example, some model types, such as neural network models, may require very large sets of training data (and long training times) and as such may be more likely to be used if other models prove to be inadequate. Other model types such as linear models may be trained and executed fairly quickly and as such may be more likely to be used if results have to be obtained rapidly, even if the quality of the result may not be as high as if other more sophisticated models are used.

Traffic Flow Data Collection Intervals

FIG. 6 illustrates examples of variations in the traffic flow data collection intervals for detecting different categories of usage policy violations, according to at least some embodiments. Because relationships between a wide variety of usage policy violations and network usage patterns may have to be learned in the depicted embodiment, different amounts of input data may be needed during training and/or during post-training execution for respective categories of usage policy violations to be detected accurately.

In the depicted embodiment, respective minimum traffic flow record collection intervals 604 are shown for three hypothetical categories 602 of usage violations A, B and C. In some cases, as in the case of category B, several hours of traffic flow data may typically have to be collected in order for accurate detections or predictions to be obtained. In other cases, as in the case of category A, several minutes of data may suffice, while in the case of category C, an interval comprising some number of seconds may be sufficient. Of course, in various embodiments, using more than the minimum amount of traffic flow data may work just as well as (or better than) using the minimum amount of data. In some embodiments, a machine learning based optimization model 610 or some other meta-parameter selection algorithm may be used to determine the optimum amount of time for which traffic flow data should be collected for detecting/predicting various policy usage violations. As such, multiple levels of machine learning computations may be implemented in some embodiments: at least one level for determining meta-parameters for determining traffic collection intervals or other data collection intervals, and at least another level for generating policy usage violation scores using the collected data.

In at least one embodiment, the amount of training and/or post-execution input data needed may be expressed in terms of traffic flows or packets, and not in terms of time as in FIG. 6. For example, to train a model to generate accurate scores for a particular category, a training data set with approximately 100000 records of network traffic flow may be required, independent of how long it took to collect those records.

In various embodiments, some policy violation behaviors may be of very short duration, so the policy violation detection service or tool may have to adjust the post-training traffic flow sample collection intervals accordingly. For example, consider an embodiment in which by default, accumulated traffic flow records are collected every 24 hours from some set of devices, and then analyzed for possible breaches of usage policy. In such an embodiment, if one of the problematic network usage patterns comprises a user creating a new account, issuing some number of packets containing malicious software to various targets during a two-hour interval, and then deleting their account, it may be hard to prevent such behaviors in real time if data is always examined in 24-hour batches. In some embodiments, the models being used for detecting policy-violating behaviors may be run using several different input data windows—e.g., some number of 1-hour windows, some number of 2-hour windows and so on.

Programmatic Requests for Policy Violation Detection

Figure 7:
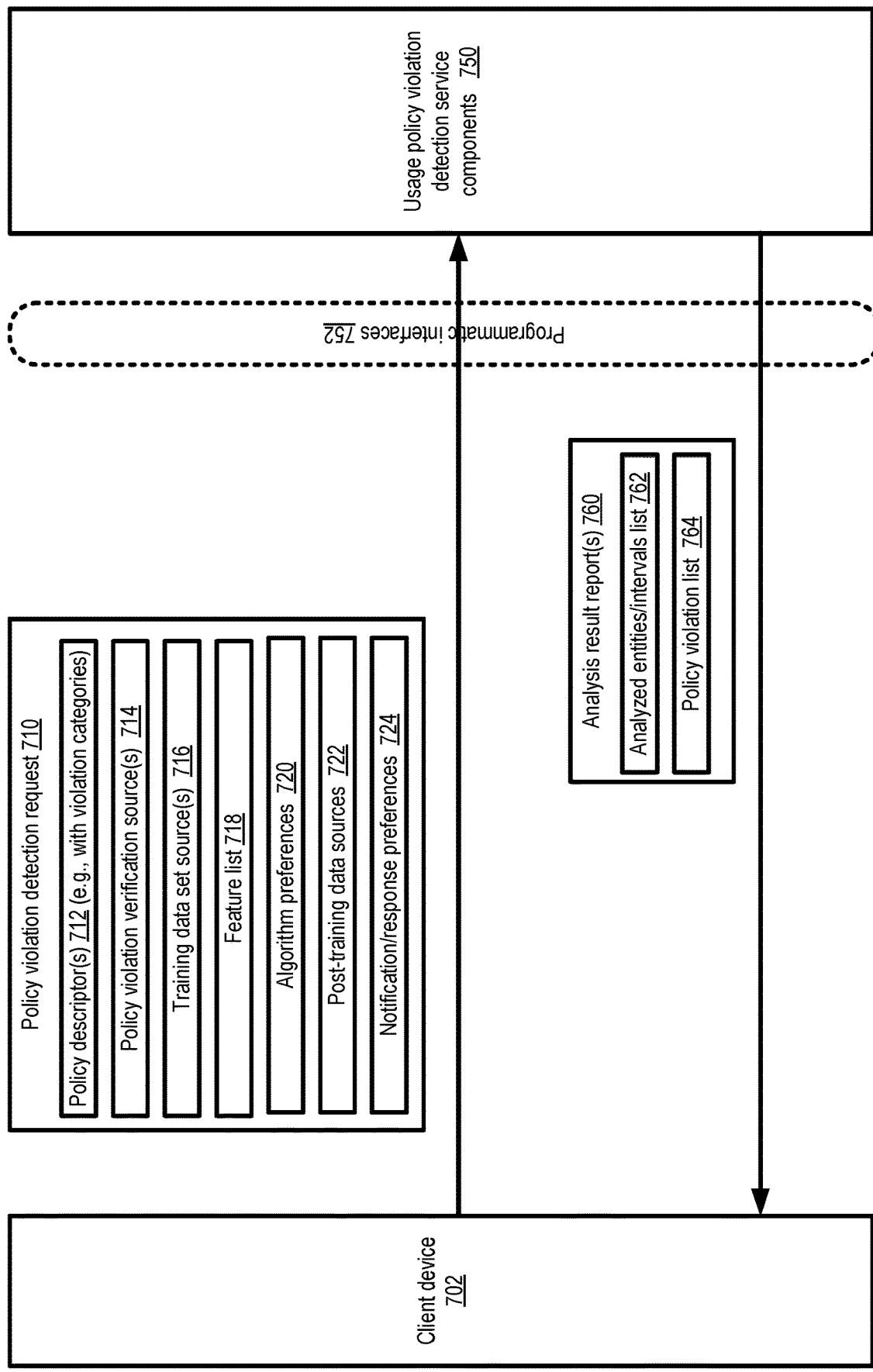
FIG. 7 illustrates example programmatic interactions of a client with a usage policy violation detection service, according to at least some embodiments.

As mentioned earlier, in various embodiments, workflows of detecting usage policy violations may be initiated in response to requests submitted programmatically to a network-accessible service. FIG. 7 illustrates example programmatic interactions of a client with a usage policy violation detection service, according to at least some embodiments. As shown, a policy violation detection request 710 comprising a plurality of parameters may be submitted from a client device 702 to components of a violation detection service 750 in the depicted embodiment.

The parameters in a request 710 may indicate various aspects of the usage policy itself, the manner in which input for the machine learning models is to be obtained, and/or how the results produced by the machine learning models are to be presented or used in various embodiments. A policy descriptor parameter 712 may indicate the rules or criteria which make certain behaviors or usages acceptable or unacceptable with respect to the resources (such as a network, a set of storage devices and/or a set of other computing devices) whose usage is being considered in the depicted embodiment. In some embodiments, the policy descriptor may also define or indicate one or more categories of policy violations whose instances are to be detected or predicted.

One or more sources 714 that can be used to verify, or strengthen the case, that policies were in fact violated by some devices or clients may be indicated in the request 710 in some embodiments. For example, with respect to certain types of policy violations, multiple reports or allegations of such violations from respective independent entities may serve to increase the confidence level that the violations have in fact occurred.

Sources 716 from which training data for the machine learning models is to be obtained may be indicated in the policy violation detection request 710 in some embodiments. Such sources may, for example, comprise one or more network-accessible storage locations and/or databases where traffic flow records are saved for some time period, or metrics collectors from which the traffic flow may be obtained directly. In embodiments in which account metadata and/or configuration settings are also used as part of the input for training and executing the models, sources for these two kinds of information may also be provided. Credentials enabling the service components 730 to obtain the data may also be indicated in detection requests 710 in some embodiments.

A list of proposed input features 718 for the machine learning models may be indicated in the request in the depicted embodiment. In some embodiments, a client may indicate preferences 720 regarding the types of algorithms or models to be used for the different usage policy violation categories in the request 710. One or more sources 722 of unlabeled input data (e.g., previously unseen traffic flow records from a production environment) for the post-training runs of the models, together with the authorization credentials needed to access such data, may be included in the request 710 in various embodiments. The post-training input data source information may also indicate the time intervals over which the data is to be collected and analyzed—e.g., that batches of traffic flow records representing H hours of activity of the devices being analyzed (and the corresponding account and configuration settings data) are to be examined at a time.

The disposition of the results of the executions of the trained models may be indicated in notification/response preferences element 724 of the policy violation detection request 710 in the depicted embodiment. The specific types of response actions to be taken for detected violations, as indicated by violation score values above a threshold, for the different violation categories may be listed in some embodiments. The thresholds which are to be used to trigger the responses may also be included in the request 710 in at least one embodiment.

It is noted that not all the elements shown in FIG. 7 may be included within programmatic requests for usage policy violation detection in some embodiments. For example, in some embodiments, a client may leave many of the decisions, such as the types of algorithms to be used, the input feature sets to be used, and the like, to the components of the policy usage violation detection service. In at least one embodiment, values of some or all of the parameters may be indicated in one or more files or databases (e.g., a database of policy violation categories), and the request 710 may indicate that the parameters should be read from the files or databases.

In response to receiving the request 710, a workflow to assemble the input data, generate the derived features if any, and train and run the appropriate models may be initiated. As results corresponding to newly-collected post-training data are generated from the trained models, one or more reports 760 may be transmitted via the programmatic interfaces 752 to the client. Such result reports may include, for example, a list 762 of the devices and time periods which were analyzed in the current iteration of the analysis, and a list 764 of any violations identified during the analysis in the depicted embodiment.

Methods for Detecting Usage Policy Violations

Figure 8:
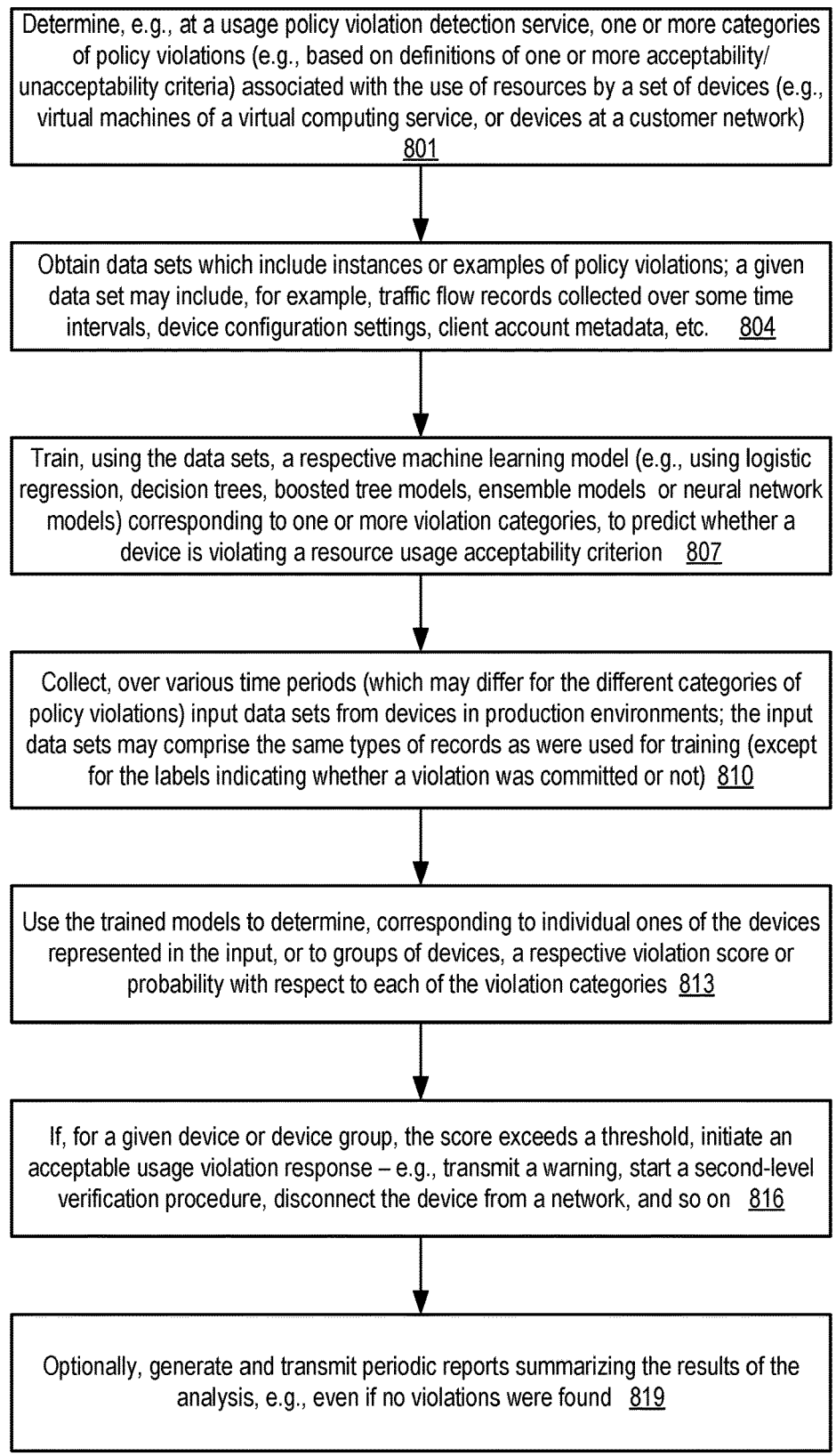
FIG. 8 is a flow diagram illustrating aspects of operations that may be performed to efficiently detect violations of resource usage policy violations using machine learning models, according to at least some embodiments.

FIG. 8 is a flow diagram illustrating aspects of operations that may be performed to efficiently detect violations of resource usage policy violations using machine learning models, according to at least some embodiments. As shown in element 801, a determination may be made, e.g., at a usage policy violation detection service or a tool for detecting policy usage violations, of one or more categories of policy violations (e.g., based on definitions of one or more acceptability/unacceptability criteria) associated with the use of resources by a set of devices. The set of devices, may, for example, be located inside a provider network (such as virtual or physical machines of a computing service) or at least in part outside a provider network (e.g., policy violations of devices at a customer network may have to be detected using the models).

One or more training data sets comprising instances or examples of policy violations of the different categories (as well as examples of acceptable or non-violating behavior) may be obtained for the machine learning models in the depicted embodiment (element 804). The training data may include, for example, various raw or derived features associated with network traffic flows, client account metadata, and/or configuration settings in some embodiments.

Using the data sets, a respective machine learning model (e.g., using logistic regression, decision trees, neural network models and/or ensemble models such as boosted tree models) corresponding to one or more violation categories may be trained to predict whether a device is violating or has violated a resource usage acceptability criterion in the depicted embodiment (element 807). Various meta-parameters, such as the amount of data required (or a reasonable minimum time interval over which data should be collected) to make a reasonably adequate prediction may also be learned in some embodiments, e.g., using other machine learning models or optimization algorithms.

After the models have been trained, input data may be collected, e.g., in a production or post-training environment from the set of devices whose behavior is to be analyzed (element 810). The collection time periods may differ for the different categories of policy violations in some embodiments. The post-training input data sets may comprise the same types of records as were used for training (except for the labels indicating whether a violation was committed or not) in the depicted embodiment.

The trained models may then be used to determine, corresponding to individual ones of the devices represented in the input, or to groups of devices, a respective violation score or probability with respect to each of the violation categories in the depicted embodiment (element 813). If, for a given device or device group, the score exceeds a threshold, an corresponding usage violation response action may be initiated in various embodiments (element 816)—e.g., a warning may be transmitted, a second-level verification procedure may be initiated to confirm whether the violation actually occurred, the suspect device may be disconnected from a network, and so on.

Optionally, in some embodiments, periodic reports summarizing the results of the analysis, e.g., even if no violations were found may be generated and transmitted (element 819). Such reports may, for example, indicate the set of devices that were analyzed, the time periods over which the data was collected, and so on.

It is noted that in various embodiments, some of the operations shown in FIG. 8 may be implemented in a different order than that shown in the figure, or may be performed in parallel rather than sequentially. Additionally, some of the operations shown in FIG. 8 may not be required in one or more implementations.

Use Cases

The techniques described above, of collecting and analyzing traffic flow records to identify examples of usage policy violations with respect to various types of resources in a networked environment may be useful in a variety of scenarios. The data centers of many large infrastructure-providing organizations, including cloud computing providers, may include tens of thousands of computing systems and other devices which are allocated to clients of the organizations. Although the vast majority of the clients may use their allocated resources in completely acceptable ways, a small fraction may sometimes deviate from the acceptable usage policies of the organization. By training machine learning models to detect unacceptable resource usage behaviors using traffic flow data that is already being collected for billing purposes, as well as account metadata and configuration settings which can be obtained without impacting customer workloads, the overhead incurred in detecting the policy violations may be minimized.

Illustrative Computer System

Figure 9:
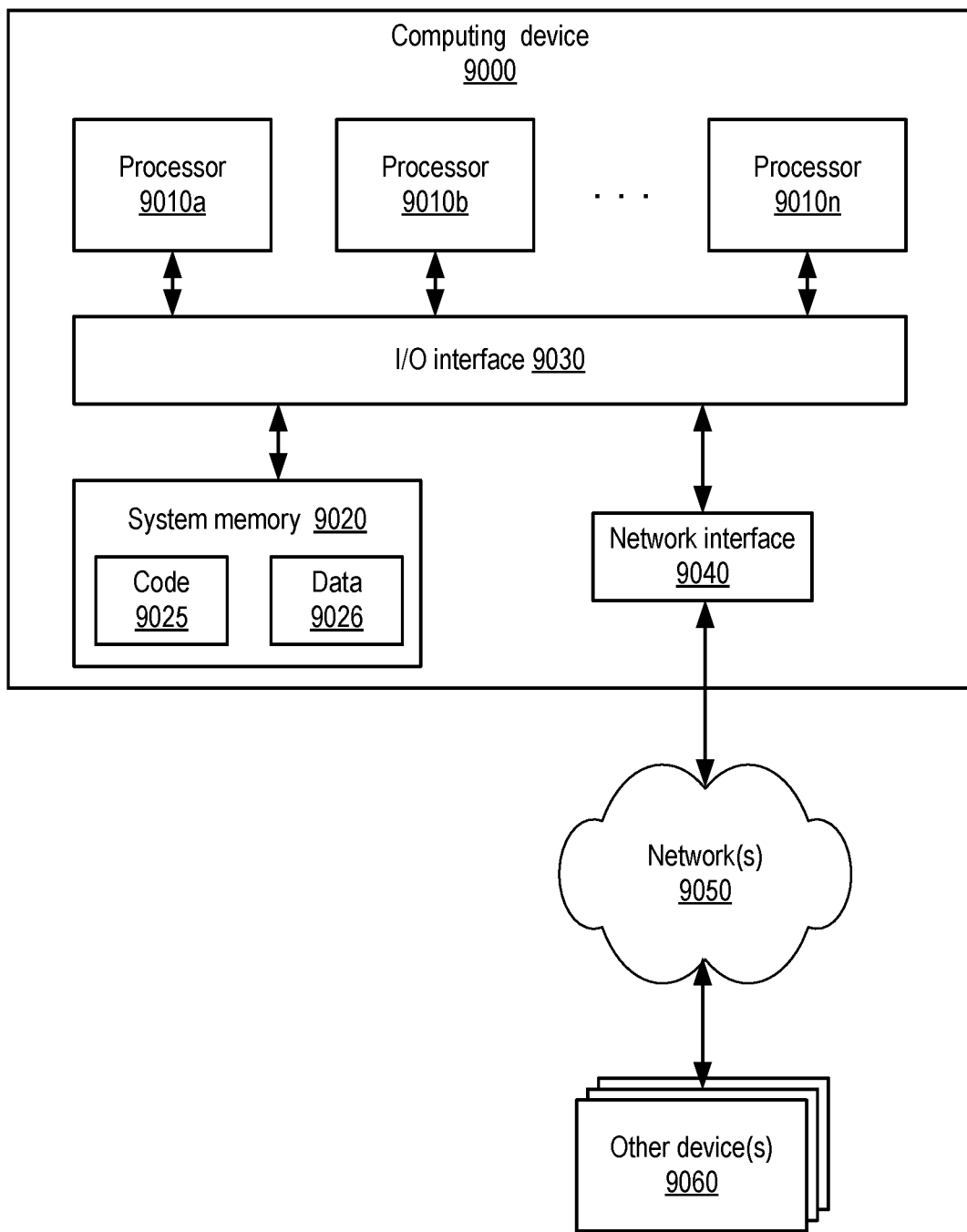
FIG. 9 is a block diagram illustrating an example computing device that may be used in at least some embodiments.

In at least some embodiments, a server that implements a portion or all of one or more of the technologies described herein, including the data collection, training and execution of machine learning models for detecting resource usage policy violations, and the initiation of responsive actions to policy violations, may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of an artificial intelligence service for detecting unacceptable network usage;
wherein the one or more computing devices are configured to:
obtain an indication that network traffic of a first set of one or more devices that implements a first service of a provider network violated at least a first network usage acceptability criterion during at least a first time interval;
obtain a first data set comprising: (a) a plurality of traffic flow records associated with violations of the first network usage acceptability criterion during the first time interval by a first device of the first set of devices that implements the first service of the provider network, wherein the first device is associated with a first client account of the first service, and wherein a traffic flow record of the plurality of traffic flow records indicates at least source and destination network addresses, (b) account metadata during at least the first time interval of the first client account associated with the first device whose network traffic violated the first network usage acceptability criterion, wherein the account metadata comprises an indication of a time period for which the first client account has existed, and (c) one or more configuration settings of the first device during at least the first time interval;
train, using at least a portion of the first data set comprising at least a portion of the plurality of the traffic flow records associated with the violations of the first network usage acceptability criterion during the first time interval by the first device that implements the first service of the provider network, and at least a portion of the account metadata, a first machine learning model to produce a trained version of the first machine learning model that predicts whether network traffic of a particular device that implements the first service of the provider network violates the first network usage acceptability criterion;
determine, using the trained version of the first machine learning model, that the probability that a second device, that implements the first service of the provider network, has violated the first network usage acceptability criterion exceeds a threshold; and
in response to the determination that the probability that the second device has violated the first network usage acceptability criterion exceeds the threshold, cause an acceptable usage violation response action to be initiated.

2. The system as recited in claim 1, wherein the first machine learning model comprises a use of one or more of: (a) a logistic regression model, (b) a tree-based model, (c) an ensemble model or (d) a neural network-based model.

3. The system as recited in claim 1, wherein the one or more computing devices are configured to:
identify a plurality of categories of policy-violating network behavior, including a first category and a second category, wherein the network traffic of the first set of one or more devices represents an example of the first category; and
train respective machine learning models to predict whether network traffic of a particular device violates network usage acceptability criteria corresponding to the plurality of categories, wherein the respective machine learning models include a second machine learning model corresponding to the second category.

4. The system as recited in claim 3, wherein the first category comprises one or more of: (a) a denial of service pattern, (b) a Trojan horse behavior pattern, (c) a pattern of non-payment or under-payment for service usage, (d) a pattern of unauthorized advertising, (e) a spam distribution pattern, (f) a spyware distribution pattern, (g) a virus distribution pattern, or (h) a rootkit distribution pattern.

5. The system as recited in claim 1, wherein the one or more computing devices are configured to:
determine that a request to train a machine learning model to predict whether network traffic of a particular device of the provider network violates the first network usage acceptability criterion has been received via a programmatic interface, wherein training of the first machine learning model is responsive to determining that the request has been received.

6. A method, comprising:
performing, by one or more computing devices;
obtaining an indication of a first data set, wherein the first data set comprises (a) a plurality of traffic flow records associated with violations of a first network usage acceptability criterion during a first time interval by a first device of a first set of one or more devices that implements a service of a provider network, wherein network traffic associated with the first set of devices violated at least the first network usage acceptability criterion during at least the first time interval, and wherein the first device is associated with a client account of the service, and (b) account metadata of the client account during at least the first time interval, wherein the account metadata comprises an indication of a time period for which the client account has existed;

training, using at least a portion of the first data set comprising at least a portion of the traffic flow records associated with the violations of the first network usage acceptability criterion during the first time interval by the first device that implements the service of the provider network, and at least a portion of the account metadata of the client account, a first machine learning model to produce a trained version of the first machine learning model that predicts whether network traffic of a particular device of a particular network violates the first network usage acceptability criterion;

determining, using the trained version of the first machine learning model, that the probability that a second device has violated the first network usage acceptability criterion exceeds a threshold; and in response to the determining that the probability that the second device has violated the first network usage acceptability criterion exceeds the threshold, initiating a response action.

7. The method as recited in claim 6, wherein the first machine learning model comprises a use of one or more of: (a) a logistic regression model, (b) a tree-based model, (c) an ensemble model or (d) a neural network-based model.

8. The method as recited in claim 6, further comprising performing, by the one or more computing devices:
identifying a plurality of categories of policy-violating network behavior, including a first category and a second category, wherein the network traffic of the first set represents an example of the first category; and
training respective machine learning models to predict whether network traffic of a particular device of the particular network violates network usage acceptability criteria corresponding to the plurality of categories, wherein the respective machine learning models include a second machine learning model corresponding to the second category.

9. The method as recited in claim 7, further comprising performing, by the one or more computing devices:
determining (a) a first traffic collection time interval associated with the first machine learning model and (b) a second traffic collection interval associated with the second machine learning model;
providing, as input to the trained version of the first machine learning model, traffic flow records collected for at least the first traffic collection time interval from a plurality of devices of the provider network; and
providing, as input to a trained version of the second machine learning model, traffic flow records collected for at least the second traffic collection time interval from a plurality of devices of the provider network.

10. The method as recited in claim 9, wherein said determining the first and second traffic collection intervals comprises utilizing another machine learning model.

11. The method as recited in claim 7, wherein the first category comprises one or more of: (a) a denial of service pattern, (b) a Trojan horse behavior pattern, (c) a pattern of non-payment or under-payment for service usage, (d) a pattern of unauthorized advertising, (e) a spam distribution pattern, (f) a spyware distribution pattern, (g) a virus distribution pattern, or (h) a rootkit distribution pattern.

12. The method as recited in claim 6, wherein the first device is assigned to the client account of the provider network, wherein the account metadata of the client account further comprises a respective indication of one or more of: a fraud score associated with the client account, billing or payment records associated with the client account, or a customer tier associated with the client account.

13. The method as recited in claim 6, wherein the first data set comprises a respective indication of one or more of: (a) a service resource class to which the first device belongs, wherein the service resource class is one of a plurality of service resource classes supported by a particular network-accessible service of a provider network, (b) an operating system of the first device, (c) a software stack of the first device, (d) a processor configuration of the first device, (e) a memory configuration of the first device or (f) a networking setting of the first device.

14. The method as recited in claim 6, further comprising performing, by the one or more computing devices:
determining that a request to train a machine learning model to predict whether network traffic of a particular device of the particular network violates the first network usage acceptability criterion has been received via a programmatic interface, wherein said training the first machine learning model is responsive to determining that the request has been received.

15. The method as recited in claim 14, wherein said training is performed using at least one computing device of a provider network, and wherein the particular network comprises at least one computing device external to the provider network.

16. A non-transitory computer-accessible storage medium storing program instructions that when executed on one or more processors cause the one or more processors to:
obtain an indication of a first data set, wherein the first data set comprises (a) a plurality of network traffic flow records associated with violations of a first resource usage acceptability criterion a first device of a first set of one or more devices that implements a service of a provider network, wherein resource usage associated with the first set of devices violated at least the first resource usage acceptability criterion, and wherein the first device is associated with a client account of the service, and (b) account metadata of the client account, wherein the account metadata comprises an indication of a time period for which the first client account has existed;

train, using at least a portion of the first data set comprising at least a portion of the network traffic flow records associated with the violations of the first resource usage acceptability criterion by the first device that implements the service of the provider network, and at least a portion of the account metadata of the client account, a first machine learning model to produce a trained version of the first machine learning model that predicts whether resource usage of a particular device of a particular network violates the first resource usage acceptability criterion;

determine, using the trained version of the first machine learning model, that the probability that a second device has violated the first resource usage acceptability criterion exceeds a threshold; and in response to the determination that the probability that the second device has violated the first resource usage acceptability criterion exceeds the threshold, provide an indication of the probability to one or more destinations.

17. The non-transitory computer-accessible storage medium as recited in claim 16, wherein the first device comprises a virtual machine instantiated at a computing service of a provider network, wherein to determine that the probability that the second device has violated the first resource usage acceptability criterion, the instructions when executed on the one or more processors cause the one or more processors to:
provide, as input to the trained version of the first machine learning model, a second data set comprising one or more traffic flow records collected at a virtualization management component of the computing service.

18. The non-transitory computer-accessible storage medium as recited in claim 16, wherein the first data set comprises an indication of one or more of: (a) a source network address, (b) a destination network address, (c) a source network port, (d) a destination network port, (e) a network packet size, (f) a networking protocol used to transmit or receive a packet, (g) a ratio of incoming to outgoing traffic during a time period, (h) a temporal distribution of network packet size, or (i) a total number of network flows during a time period.

19. The non-transitory computer-accessible storage medium as recited in claim 16, wherein the instructions when executed on the one or more processors cause the one or more processors to:
in response to determining, using the trained version of the first machine learning model, that the probability that a second device has violated the first resource usage acceptability criterion exceeds a threshold, cause a first responsive action to be initiated, wherein the first responsive action comprises one or more of: (a) initiating additional analysis of operations of the second device, (b) generating a warning to an entity to whom the second device is assigned or (c) terminating network connectivity of the second device with respect to a third device.

20. The non-transitory computer-accessible storage medium as recited in claim 16, wherein the instructions when executed on the one or more processors cause the one or more processors to:
determine that a request to train a machine learning model to predict whether resource usage of a particular device of the particular network violates the first resource usage acceptability criterion has been received via a programmatic interface, wherein said training the first machine learning model is responsive to determining that the request has been received.

* * * * *